United States Patent [19]

Yoshida

[11] Patent Number: 5,664,138
[45] Date of Patent: Sep. 2, 1997

[54] APPARATUS FOR HANDLING OUT-OF-ORDER EXCEPTIONS IN PIPE-LINED PARALLEL PROCESSING THAT PREVENTS EXECUTION OF ALL INSTRUCTIONS BEHIND EXCEPTION PREDICTED INSTRUCTION AND ABORTS IF EXCEPTION ACTUALLY OCCURS

[75] Inventor: Takeshi Yoshida, Tokyo, Japan

[73] Assignee: Kabushiki Kaisha Toshiba, Kawasaki, Japan

[21] Appl. No.: 863,180

[22] Filed: Apr. 3, 1992

[30] Foreign Application Priority Data

Apr. 5, 1991 [JP] Japan .................................. 3-073341
Nov. 14, 1991 [JP] Japan .................................. 3-299100

[51] Int. Cl.$^6$ .............................. G06F 9/302; G06F 9/38
[52] U.S. Cl. ........................ 395/395; 395/382; 395/383; 395/185.03; 395/392; 395/591; 395/596; 364/231.8; 364/944.6
[58] Field of Search ................................ 364/736, 736.5, 364/748, 200, 231.8, 944.6; 395/185.03, 382, 383, 391, 392, 395, 591, 596

[56] References Cited

U.S. PATENT DOCUMENTS

| | | | |
|---|---|---|---|
| 4,750,112 | 6/1988 | Jones et al. | 364/200 |
| 4,760,519 | 7/1988 | Papworth et al. | 364/200 |
| 4,777,593 | 10/1988 | Yoshida . | |
| 4,875,160 | 10/1989 | Brown, III | 364/200 |
| 4,879,676 | 11/1989 | Hansen . | |
| 4,893,233 | 1/1990 | Denman et al. | 364/200 |
| 4,903,264 | 2/1990 | Talgam et al. | 371/16.1 |
| 4,916,652 | 4/1990 | Schwarz et al. . | |
| 5,051,885 | 9/1991 | Yates, Jr. et al. | 364/200 |
| 5,075,844 | 12/1991 | Jardine et al. | 395/375 |
| 5,109,381 | 4/1992 | Duxbury et al. | 371/16.5 |
| 5,121,486 | 6/1992 | Kurihara et al. | 395/325 |
| 5,193,158 | 3/1993 | Kinney et al. | 395/375 |
| 5,193,187 | 3/1993 | Strout, II et al. | 395/650 |
| 5,226,126 | 7/1993 | McFarland et al. | 395/375 |
| 5,247,628 | 9/1993 | Grohoski . | |
| 5,251,306 | 10/1993 | Tran . | |
| 5,278,840 | 1/1994 | Cutler et al. | 371/16.1 |
| 5,283,874 | 2/1994 | Hammond | 395/375 |
| 5,297,263 | 3/1994 | Ohtsuka et al. | 395/375 |
| 5,341,482 | 8/1994 | Cutler et al. | 395/375 |
| 5,363,495 | 11/1994 | Fry et al. | 395/375 |
| 5,375,212 | 12/1994 | Saini | 395/375 |
| 5,379,379 | 1/1995 | Becker et al. | 395/250 |

FOREIGN PATENT DOCUMENTS 210427  1/1990  Japan .

OTHER PUBLICATIONS

IEEE Transactions on Computers, vol. c–33, No. 11, Nov. 1984, pp. 1013–1022, S. Weiss, et al., "Instruction Issue Logic Pipelined Supercomputers".

*Primary Examiner*—Thomas C. Lee
*Assistant Examiner*—Ki S. Kim
*Attorney, Agent, or Firm*—Oblon, Spivak, McClelland, Maier & Neustadt, P.C.

[57] ABSTRACT

A parallel processing control apparatus comprises processing blocks each providing an equal function and incorporating pipeline operation units; a status register for storing statuses of the processing blocks; an instruction feeder for simultaneously allocating instructions to the processing blocks; a flagging unit for setting a flag for a corresponding one of the processing blocks to indicate that at least one instruction fed to another of the processing blocks and positioned, on a sequential model, behind an instruction being processed in the flagged processing block has been processed or passed through a specific stage; a flag holder for holding the flag; and a write controller for selecting a processing block whose status is to be written in the status register.

8 Claims, 14 Drawing Sheets

FIG.5

FPU 1

D | 1clk | 2clk | 3clk | 4clk | 5clk | 6clk
  ...... M | 1st | 2nd | 3rd
            A  | 1st | 2nd | 3rd
                  A | 1st | 2nd | 3rd

FPU 2

D | 1clk | 2clk ............ 5clk | 6clk | 7clk | 8clk | 2nd | 3rd
                                                    A | 1st | 2nd | 3rd
                                                       M | 1st | 2nd | 3rd
                                                            A | 1st | 2nd

← OUTPUT CONFLICT →

FPU 3

D | 1clk | 2clk | 3clk | 4clk | 5clk | 6clk
  ...... M | 1st | 2nd | 3rd
            M | 1st | 2nd | 3rd
                  A | 1st | 2nd

FPU 4

D | 1clk | 2clk ............ 5clk | 6clk | 7clk | 8clk | 2nd | 3rd
                                                    A | 1st | 2nd FPU1  D  | 1clk | 2clk | 3clk | 4clk | 5clk | 6clk | 7clk | 8clk |
            M    | 1st  | 2nd  | 3rd  |
            STOP FEEDING INSTRUCTIONS FPU1  A  | 1st | 2nd | 3rd |
            D   | 1clk | 2clk | 3clk | 4clk | 5clk | 6clk | 7clk | 8clk | 2nd | 3rd |
            STOP FEEDING INSTRUCTIONS FPU1  A  | 1st | 2nd | 3rd |
            M   | 1st | 2nd | 3rd | 3rd | 3rd | 3rd | 3rd | 3rd | 3rd | 3rd |
            STOP FEEDING INSTRUCTIONS FPU1  M  | 1st | 2nd | 3rd |
            A   | 1st | 2nd | 3rd | 3rd | 3rd | 3rd | 3rd | 3rd | 3rd | 3rd |
            STOP FEEDING INSTRUCTIONS

: EXCEPTION IS PREDICTED

FIG.12

| INTEGER OPERATION PORTION | D | E | W | W | W | W | W | ...... | W | W | | |
|---|---|---|---|---|---|---|---|---|---|---|---|---|

↑ EXCEPTION OCCURRED     RELEASE A STALL SIGNAL     TRAP ? ↑

| FALU | D | E1 | E2 | E2 | E3 | W | W | ...... | W | W |
|---|---|---|---|---|---|---|---|---|---|---|

| MULTIPLIER | D | E1 | E2 | E2 | E2 | E2 | ...... | E2 | E2 | E2 | E3 | W |
|---|---|---|---|---|---|---|---|---|---|---|---|---|

↑ EXCEPTION OCCURRED     RELEASE A STALL SIGNAL. ↑

| DIVIDE | D | E1 | E1 | ...... | E1 | E2 | E3 | W |
|---|---|---|---|---|---|---|---|---|

APPARATUS FOR HANDLING OUT-OF-ORDER EXCEPTIONS IN PIPE-LINED PARALLEL PROCESSING THAT PREVENTS EXECUTION OF ALL INSTRUCTIONS BEHIND EXCEPTION PREDICTED INSTRUCTION AND ABORTS IF EXCEPTION ACTUALLY OCCURS

BACKGROUND OF THE INVENTION

1. Field of the Invention

The present invention relates to a parallel processing control apparatus for controlling a parallel processor that simultaneously processes a plurality of instructions.

2. Description of the Prior Art

Parallel processors employ a parallel processing system such as a superscalar system and a VLIW system, for simultaneously issuing and processing a plurality of instructions. These parallel processors are complicated to control. In particular, the superscalar parallel processor is very complicated because it is usually required to realize upper compatibility to use software of conventional sequential processors and because it is required, when processing instructions, to consider what it might be if the instructions were processed by the conventional sequential processors.

With a development of LSI technology in recent years, processing units such as floating-point processing units, which have been usually fabricated on a separate chip and used with the superscalar parallel processor, are mounted on a single chip with other processing units.

The number of pipeline stages of the floating-point processing units usually differs from those of other processing units, and therefore, the floating-point processing units take a longer processing time. Controlling a plurality of such processing units having different processing times is very difficult for the superscalar system. It is necessary, therefore, to provide a parallel processing control apparatus that efficiently controls processing units involving different processing times.

When parallelly controlling a plurality of processing units involving different numbers of pipeline stages and different processing times, a conventional parallel processing control apparatus sometimes causes an instruction to overtake the preceding instruction if the preceding instruction involves more pipeline stages than the succeeding instruction.

If such an exception of overtaking occurs after the preceding instruction is completely processed, a problem is to determine which instruction must be executed or aborted. If a plurality of instructions are simultaneously completed, there is a problem of selecting one instruction to write its status in a status register.

A write reservation register may be employed to control the order of outputs of a plurality of operation units having different pipeline stages. This, however, increases hardware because many registers for storing values must be prepared to cover a difference between the maximum and minimum numbers of pipeline stages.

SUMMARY OF THE INVENTION

An object of the invention is to provide a parallel processing control apparatus used for a parallel processing system. The parallel processing system is capable of simultaneously issuing a plurality of instructions and involves a plurality of processing blocks of the same function each including operation units whose processing time differs depending on instructions to process. Even if an exception occurs in processing instructions, the control apparatus is able to carry out an exception process while maintaining the sequentiality of the instructions.

Another object of the invention is to provide a parallel processing control apparatus used for a parallel processing system that is capable of simultaneously issuing a plurality of instructions and involves a plurality of operation units of different functions and different processing times. Even if an exception occurs in processing instructions, the control apparatus is able to carry out an exception process while maintaining the sequentiality of the instructions.

In order to accomplish the objects, a parallel processing control apparatus according to a first aspect of the invention comprises a plurality of processing blocks each providing an equal function and incorporating operation units for achieving a pipeline operation; a status register for storing statuses of the processing blocks; instruction feeding means for simultaneously allocating instructions to the processing blocks, respectively, according to a predetermined sequence; flagging means for setting a flag to indicate that at least one instruction that has been completed or passed through a specific stage in another processing block is positioned, on a sequential model, behind an instruction that is being executed in a processing block corresponding to the flagging means in question; flag holding means for holding the flag; and a write decision means for selecting, when operations are normally completed with no exception happening, a processing block having no flag and being hindmost on the sequential model among the processing blocks that have completed operations, according to the order of the processing blocks and the flags held in the flag holding means, and selecting, when exceptions have occurred, a processing block having no flag and being foremost on the sequential model among the exception caused blocks, thus determining a processing block whose status is to be written in the status register.

If a plurality of instructions are simultaneously normally completed in the processing blocks of the parallel processing control apparatus, a processing block having no flag and lastly receiving an instruction is selected among the processing blocks which have simultaneously normally completed the instructions, and a result of operation of the selected processing block is written in the status register.

If an instruction causes an exception in the parallel processing apparatus having the processing blocks of the same function, instructions that have been issued with the exception caused instruction and are ahead of the exception caused instruction on the sequential model are continuously processed, and those behind the exception caused instruction are aborted, according to values held in the flag holding means. The status of the exception caused instruction is written in the status register.

When a plurality of instructions simultaneously cause exceptions, the exception occurred in a processing block that is foremost in a predetermined order is determined to be foremost in time series, and the status of the processing block of the foremost exception is written in the status register. Instructions that are ahead of the foremost exception instruction in time series are continuously processed, and those behind the foremost exception instruction including those caused the exceptions are aborted.

According to a second aspect of the invention, there is provided a parallel processing control apparatus comprising decision value holding means for holding a value indicating the position of an instruction issued to a corresponding operation unit among instructions issued with the instruction in question; flagging means for setting a flag to indicate that any instruction executed in another operation unit is, on a sequential model, behind an instruction that is being executed in a corresponding operation unit; flag holding means for holding the flag; and selection means for selecting an operation unit whose status is to be written in a status register when operations are completed or when an exception occurs.

When no exception occurs and when an instruction is normally completed with no flag held in a corresponding flag holding means to indicate that the instruction in question has not been overtaken by another instruction, the status of the completed instruction is written in the status register.

If the flag is set to indicate that the status of an instruction that is behind the completed instruction in question on a sequential model is already written in the status register, the status of the completed instruction in question is not written in the status register.

If a plurality of instructions are normally simultaneously completed in the parallel processing control apparatus having the operation units of different functions, a last one on a sequential model with no flag is selected among the simultaneously completed instructions according to values stored in the decision value holding means, and the status of the selected instruction is written in the status register. It is assured that flagged ones of the simultaneously completed instructions are ahead of those having no flag, so that the flagged instructions will never be selected to write their statuses.

If any instruction causes an exception in the parallel processing control apparatus having the operation units of different functions, instructions issued with the exception caused instruction and determined to be ahead of the exception caused instruction on a sequential model according to values held in the decision value holding means are continuously processed, while those behind the exception caused instruction are aborted. The status of the exception caused instruction is written in the status register.

If a plurality of instructions cause exceptions, the status of one of the exception caused instructions that is determined to be foremost on the sequential model according to values stored in the decision value holding means is written in the status register. Instructions ahead of the status written instruction on the sequential model are continuously processed, and those behind the status written instruction including the exceptions caused instructions are aborted.

These and other objects, features and advantages of the invention will be more apparent from the following detailed description of preferred embodiments in conjunction with the accompanying drawings.

BRIEF DESCRIPTION OF THE DRAWINGS

FIG. 5 is a view showing operation timing of FPUs of FIG 1 when data conflicts occur in the FPUs;

FIG. 12 is a view showing timing of instruction processing and exception occurrence with the parallel processing control apparatus according to the second embodiment freezing instructions;

DETAILED DESCRIPTION OF THE EMBODIMENTS

Figure 1:
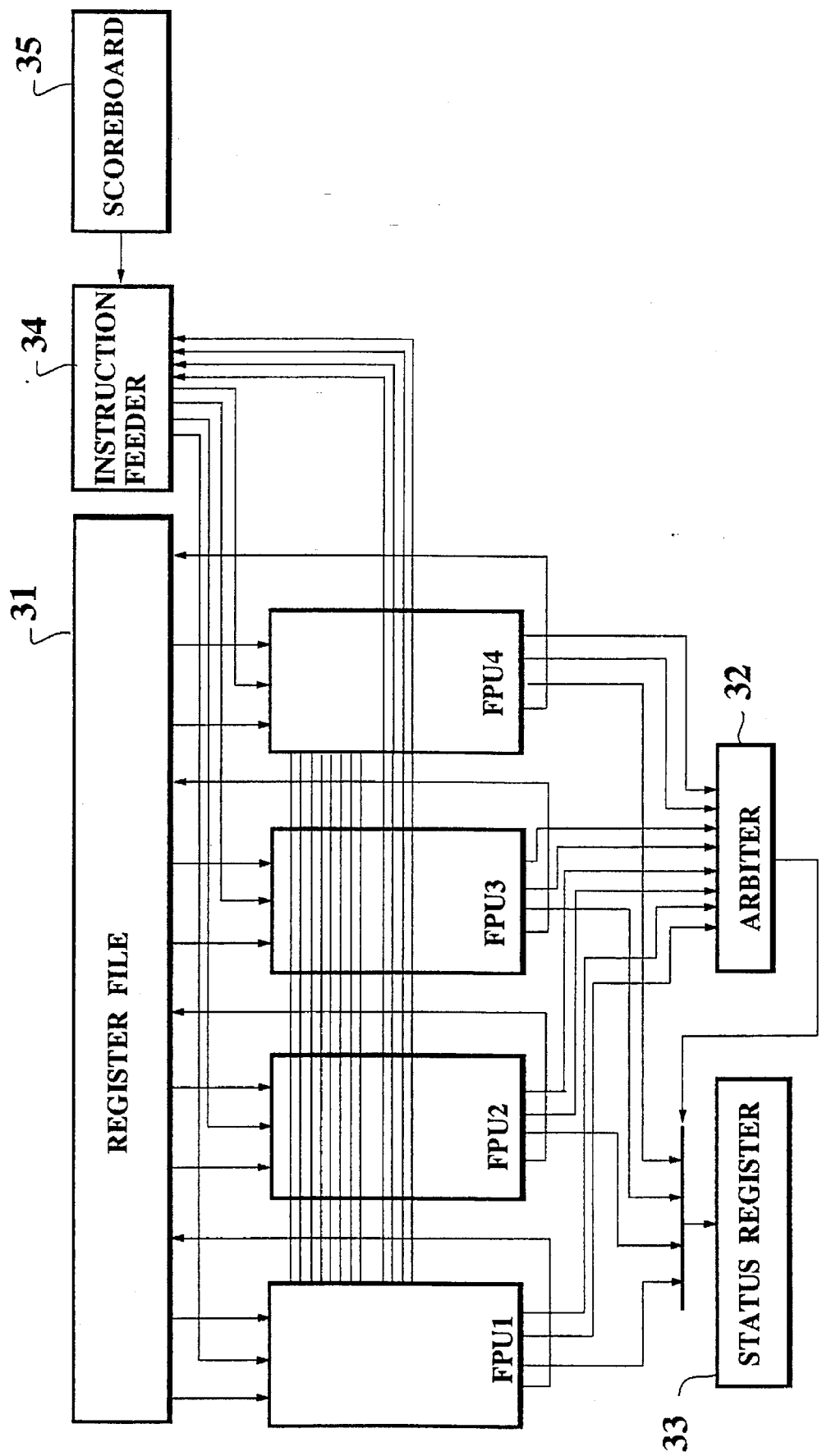
FIG. 1 is a block diagram showing a parallel processing control apparatus according to a first embodiment of the invention.

FIG. 1 shows a parallel processing control apparatus having a plurality of processing blocks of the same function according to the first embodiment of the invention. In this embodiment, the control apparatus is used for a floating-point processing portion of a superscalar parallel processing apparatus.

The floating-point processing portion of FIG. 1 comprises four FPUs 1 through 4, a 12-port register file 31, an arbiter 32, a status register 33, an instruction feeder 34, and a scoreboard 35.

Figure 2:
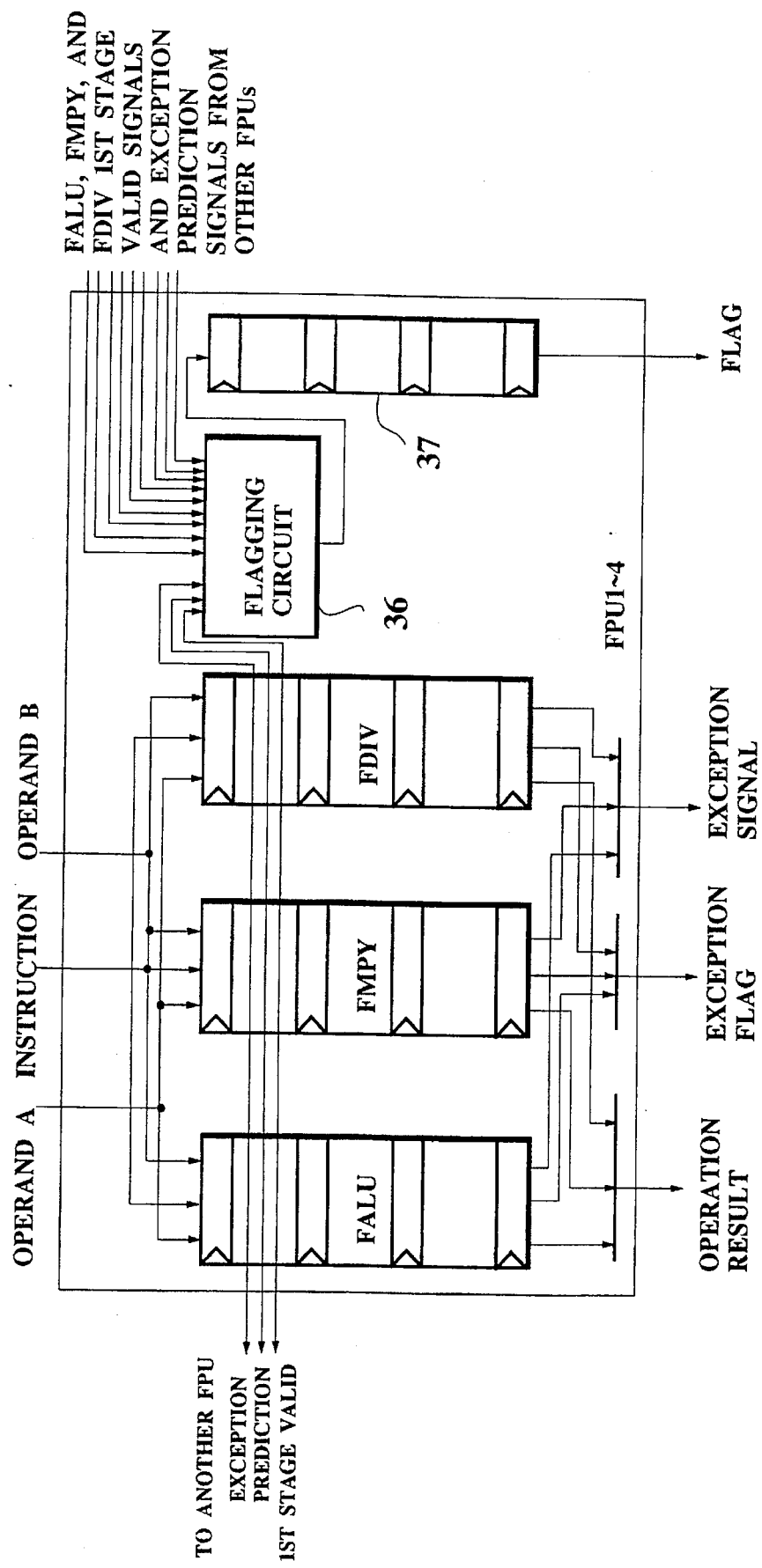
FIG. 2 is a view showing the internal structure of any one of FPUs 1 to 4 of FIG. 1.

FIG. 2 shows a structure of one of the FPUs 1 to 4. The FPU comprises three operation units FALU, FMPY, and FDIV, a flagging circuit 36 for the FDIV, and a pipeline register 37 for holding flags. Each of the operation units FALU, FMPY, and FDIV has a 3-stage pipeline structure. Each of the FALU and FMPY provides an operation result in three clock periods. The FDIV carries out repetitive operations in the first stage, and therefore, provides a result in 10 clock periods, i.e., 8 clock periods in the first stage, and one clock period in each of the second and third stages.

The FPUs 1 to 4 receive one instruction each in response to the same clock pulse. Namely, four instructions at the maximum are simultaneously fed to the four FPUs 1 to 4. Each of the FPUs carries out a pipeline operation so that, if there is no trouble, one instruction is fed to each of the FPUs at every clock pulse. It is impossible to feed a divide instruction to any FPU if its FDIV is processing the repetitive operations in the first stage.

When feeding instructions to the FPUs 1 to 4, the scoreboard 9 handles data dependency and conflicts, except a read-read conflict. No read-read conflict will occur because the register file 31 has a plurality of read ports and write ports. Namely, the register file 31 has 12 ports in total, i.e., eight read ports (two for each FPU) and four write ports (one for each FPU).

Numbers 1 to 4 are assigned to the FPUs 1 to 4, respectively. Namely, the FPU 1 is provided with a number of 1, FPU 2 with 2, FPU 3 with 3, and FPU 4 with 4. This means that, when instructions are simultaneously provided to the FPUs 1 to 4, the FPU 1 receives the first one in time series of the instructions, the FPU 2 the second one, the FPU 3 the third one, and the FPU 4 the last one.

If there are instructions FALU (A1), FMPY (M1), FDIV (D1), and FALU (A2) to be sequentially processed in this order, the instruction A1 is fed to the FPU 1, the instruction M1 to the FPU 2, the instruction D1 to the FPU 3, and the instruction A2 to the FPU 4.

If the operation unit FDIV of the FPU 3 is repeatedly processing a divide instruction in the first stage before those four instructions are fed, the instruction D1 is not fed to the FPU 3 but to the FPU 4. Accordingly, the instruction A2 is fed to the FPU 1 in the next clock period.

Even if the operation unit FDIV of the FPU 3 is repeatedly processing the divide instruction in the first stage, it is possible to feed the instruction A2 to the FPU 3, and the instruction D1 to the FPU 4. In this case, it is necessary to keep data representing a sequential relationship of these instructions because the order of the instructions will be changed. This may complicate a circuit arrangement.

When an instruction reaches the first pipeline stage of the operation unit FALU or FMPY or the first clock period of the first pipeline stage of the operation unit FDIV in any of the FPUs 1 to 4, it is checked to see whether or not any other instruction has passed the same stage. Each of the FPUs 1 to 4 provides a signal indicating that the first pipeline stage of the FALU or FMPY is processing an instruction, and a signal indicating that the first clock period of the first pipeline stage of the FDIV is processing an instruction.

Each of the FPUs 1 to 4 receives six signal lines from the other FPUs, i.e., two signal lines from each of the other FPUs. The number of signal lines of one processing block is determined by the numbers of clock periods required by pipelines in the processing block. Each FPU of the embodiment has two signal lines, one for the operation units FALU and FMPY each involving three clock periods, and the other for the operation unit FDIV involving 10 clock periods.

The FDIV of each FPU has the flagging circuit 36 for setting a flag indicating whether or not an instruction now being processed has been overtaken by another instruction.

Figure 3:
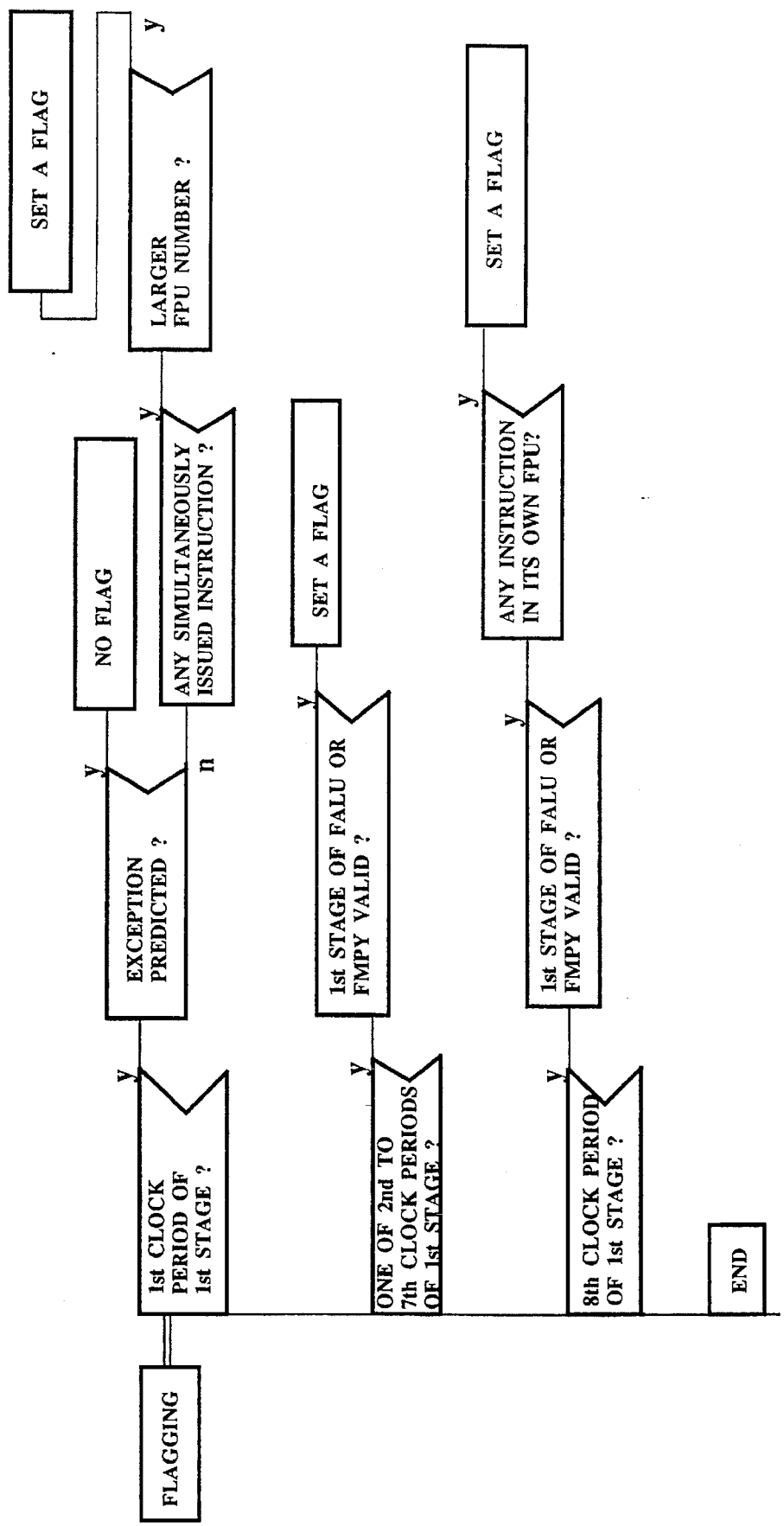
FIG. 3 is a PAD showing an algorithm of preparing a flag in the parallel processing control apparatus according to the first embodiment.

FIG. 3 shows a PAD explaining a flag set by the flagging circuit 36 of the FDIV of the FPU 1.

The flagging circuit 36 of each FDIV monitors:
(1) whether or not the FDIVs of the FPUs having larger FPU numbers than its own FPU are processing instructions in the first clock period of the first stage;
(2) whether or not instructions are being processed in the first stages of the FALUs and FMPYs in all FPUs;
(3) whether or not an instruction is being processed in the first stage of its own FDIV; and
(4) whether or not the instruction is being processed in the first clock period of the first stage of the FDIV.

When the items (3) and (4) are true, the FDIV is processing the instruction in the first clock period of the first stage. In this case, if the items (1) and (2) tell that there is at least one valid signal from any FPU whose FPU number is larger than that of the FPU in question, it is determined that the instruction being processed in the FDIV in question is overtaken by another instruction, and therefore, a flag is set.

If the item (3) is true and the item (4) is not, the instruction is being processed in any one of the second to eighth clock periods of the first stage of the FDIC. In this case, if the item (2) is true, it is determined that the instruction being processed in the FDIV is overtaken by another instruction due to the lengths of the pipelines, and a flag is set.

Figure 4:
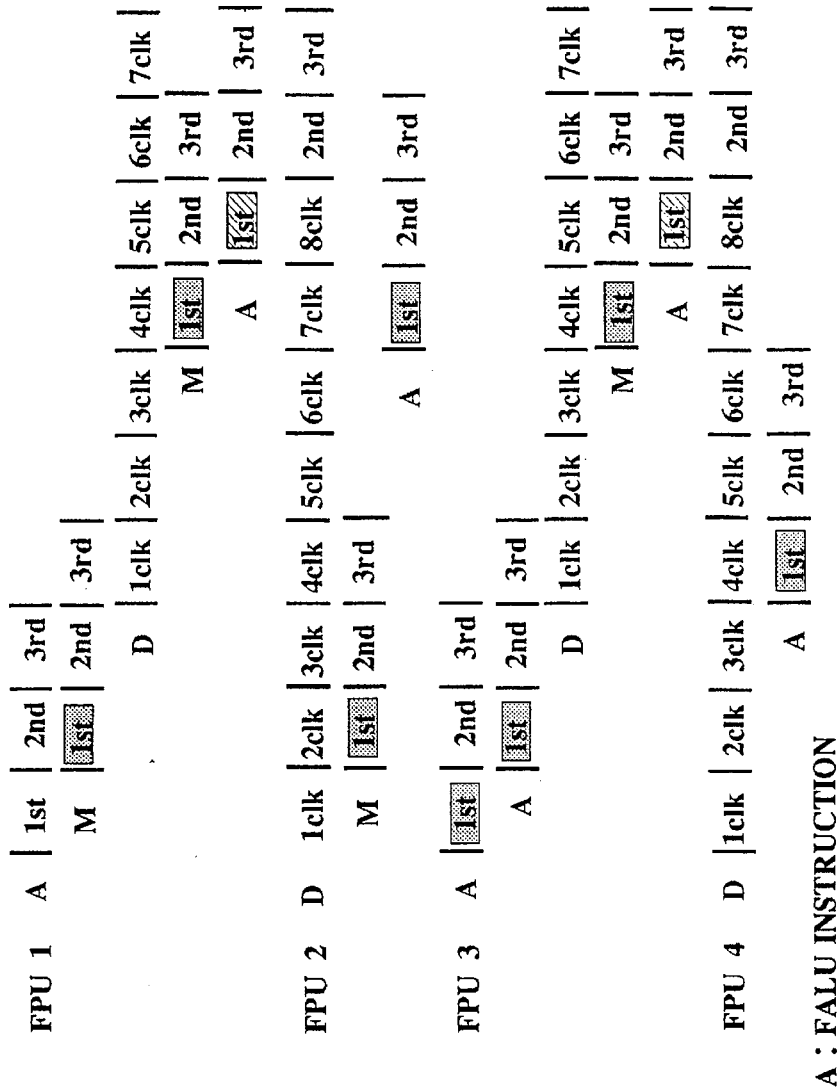
FIG. 4 is a view showing flag setting timing of a flagging circuit of FIG. 1.

FIG. 4 shows an example of setting a flag due to an FDIV instruction fed to the FPU 2.

When the FDIV instruction is fed to the FPU 2, a FALU instruction is fed to the FPU 1, a FALU instruction to the FPU 3, and an FDIV instruction to the FPU 4. Among these simultaneously fed instructions, the FALU instruction to the FPU 3 and the FDIV instruction to the FPU 4 cause the FDIV instruction to the FPU 2 to set a flag. This is because the FPU 3 and FPU 4 have larger FPU numbers than the FPU 2.

In the next clock period, an FMPY instruction is fed to the FPU 1, an FMPY instruction to the FPU 2, and a FALU instruction to the FPU 3. These three instructions overtake the FDIV instruction processed in the FPU 2 due to the numbers of the processing steps of the respective instructions. Accordingly, each of these three instructions causes the FDIV of the FPU 2 to set a flag. In this example, however, the first clock period of the FDIV of the FPU 2 has already set the flag, so that no change is made by these three instructions. If the flag has not been set in the first clock period of the FDIV of the FPU 2, the three instructions naturally cause the FDIV of the FPU 2 to set the flag.

In the fourth clock period, an FDIV instruction is fed to the FPU 1, and another FDIV instruction is to be fed to the FPU 2. The operation unit FDIV of the FPU 2, however, is processing the previous FDIV instruction in the first stage, so that the instruction feeder 34 stops feeding the next FDIV instruction to the FPU 2, and instead, feeds the same to the FPU 3. Accordingly, a FALU instruction originally scheduled to the FPU 3 is fed to the FPU 4. Among the three instructions fed in the fourth clock, the FALU instruction to the FPU 4 causes the FDIV instruction in the FPU 2 to set a flag. The FDIV instructions in the FPU 1 and FPU 3 never overtake the FDIV instruction in the FPU 2.

In the seventh clock period, an FMPY instruction is fed to the FPU 1, a FALU instruction to the FPU 2, and an FMPY instruction to the FPU 3. All of these instructions cause the FDIV instruction in the FPU 2 to set a flag.

In the eighth clock period, FALU and FMPY instructions are fed. These FALU and FMPY instructions cause a problem because they are completed simultaneously with the FDIV instruction in the FPU 2. The FALU and FMPY instructions are behind the FDIV instruction in time series, so that they substantially overtake the FDIV instruction. Consequently, when the FALU and FMPY instructions are fed to the FPUs other than the FPU 2 and no FALU and FMPY instructions are fed to the FPU 2, the FDIV instruction in the FPU 2 sets a flag.

If a FALU or FMPY instruction is issued to the FPU 2 in the eight clock period, a result of the FDIV instruction and a result of the FALU or FMPY instruction conflict with each other at an output of the FPU 2. When the conflict occurs, the FPU 2 that has caused the conflict issues a wait request signal to the other FPUs, to freeze execution of instructions. In the FPU 2, the FDIV instruction is ahead of the newly fed instruction in time series, so that the FPU 2 provides a result of the FDIV instruction at first while freezing the FALU or FMPY instruction. At the same time, the other FPUs freeze their FALU and FMPY instructions but may continuously process or freeze their FDIV instructions depending on an architecture.

In this embodiment, the FDIV instructions are continuously processed because they never overtake other instructions even if they are continuously processed. Namely, the FALU and FMPY instructions in the other FPUs are frozen, and only the FDIV instructions are processed. Accordingly, the FALU and FMPY instructions issued in the eighth clock period cause no influence in time series. Consequently, if a FALU or FMPY instruction is issued to the FPU 2 in the eighth clock period, the other FALU and FMPY instructions issued to the other FPUs in the eighth clock period do not cause the FDIV instruction in the FPU 2 to set a flag.

Once the wait request signal is issued, the instruction feeder 34 stops issuing instructions until the signal falls. This signal will not affect an FDIV instruction fed to another FPU simultaneously with the FDIV instruction that has caused the conflict.

If conflicts simultaneously occur in a plurality of FPUs, it is possible to operate an FPU having a younger FPU number among the conflicted FPUs. It is also possible to operate the FDIVs including those causing no conflict. In this case, there is a possibility that both the conflict-caused and conflict-not-caused FPUs have FDIV instructions simultaneously issued. In this case, the FDIV instructions in the conflict-not-caused FPUs may have flags set by the FALU or FMPY instruction that has caused the conflict. It is also possible to execute all FDIV instructions simultaneously fed.

If each FPU involves several kinds of pipelines instead of the two kinds, i.e., the 3-clock and 10-clock pipelines, it is necessary to stop instructions involving processing stages whose number is equal to or smaller than the number of processing stages of an instruction that must be stopped due to a conflict at an output. Instructions whose number of processing stages is longer than that of the instruction to be stopped due to the conflict can be continuously processed.

FIG. 5 shows an example in which a conflict occurs in the FPU 2. The conflict occurs in the third stages of the FPU 2 to put the operation units in the FPUs 1 through 4 in a wait state. An FDIV instruction fed to the FPU 4 simultaneously with an FDIV instruction to the FPU 2 is continuously processed, and similar to a result of the FDIV instruction of the FPU 2, a result of the FDIV instruction of the FPU 4 is written in the register file 31.

An FPU whose operation result is to be written in the status register 33 is determined according to the FPU numbers and FDIV flags. If a plurality of FPUs simultaneously provide results, any FPU having a flag indicating that an FDIV instruction processed therein has been overtaken by other instructions will not be selected. Among FPUs with no flag, an FPU having a larger FPU number is selected. Namely, the operation status of a hindmost instruction in time series is written in the status register 33.

These procedures are taken when there is no overflow or underflow exception. If there is such an exception, more complicated control will be carried out. Control for dealing with exceptions will be explained.

FPUs according to the embodiment of the invention predict exceptions. The exception prediction is carried out in such a way to ensure that an exception will never happen upon completion of operation, if it is predicted that no exception will happen.

In a floating-point processing, whether or not an exception will actually happen is usually known only in the last stage of operation. When a plurality of operation units having different numbers of pipeline stages are operated in parallel and when an exception occurs in one of the operation units having a larger number of pipeline stages, some instruction that is behind the exception caused instruction in time series will have been completed at the time of occurrence of the exception.

To deal with such a case, an exception prediction circuit is disposed. If the circuit predicts an exception on an instruction, other instructions will not be completely processed until the exception predicted instruction is completely processed, thereby preventing any instruction from overtaking the exception predicted instruction.

Figure 6:
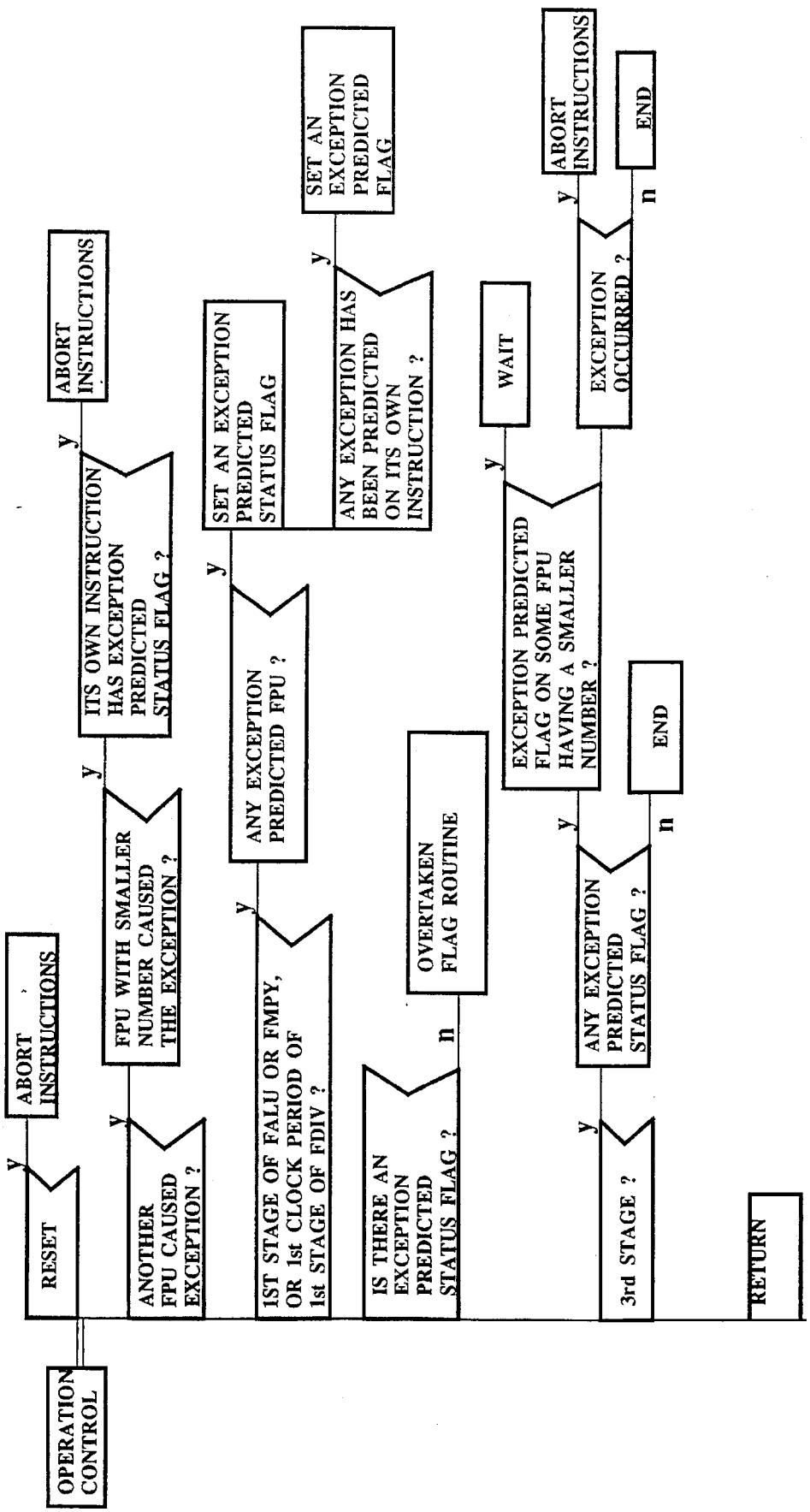
FIG. 6 is a PAD showing instruction processes with exceptions being predicted to occur.

FIG. 6 is a PAD showing operations with exception prediction. The exception prediction is carried out in the first stage of the operation units FALU and FMPY and in the first clock period of the first stage of the operation unit FDIV.

The exception prediction circuit receives data related to an instruction, an operand, a type, and exception mask information. Once predicting an exception on some instruction, the exception prediction circuit provides an exception predicted signal to the instruction feeder and FPUs. The instruction feeder then stops issuing instructions until the exception predicted instruction is completed. The FPU that has caused the exception predicted signal sets an exception predicted flag.

The exception predicted instruction and other instructions fed to the FPUs simultaneously with the exception predicted instruction set exception predicted status flags and are processed under an exception predicted status. Instructions that have been issued before the exception predicted instruction in time series, i.e., the instructions issued to FPUs having smaller FPU numbers than the FPU having the exception predicted instruction are completely processed. Also, instructions having no exception predicted status flag are completely processed.

Among the instructions having the exception predicted status flags, those issued to the FPUs having larger FPU numbers than the FPU having the exception predicted flag are stopped until the exception predicted instruction is processed up to the last stage where it is determined whether or not the exception actually occurs, and until the instructions having the exception predicted status flags and smaller FPU numbers than the exception predicted FPU are processed up to the last stages.

For example, if an FDIV instruction given to one FPU is predicted to cause an exception, FALU and FMPY instructions, etc., issued with the exception predicted FDIV instruction are kept in their third stages until the FDIV instruction is processed up to its third stage and until it is determined whether or not the exception actually happens.

Any FPU having an exception predicted flag does not set an overtaken flag. The reason for this is because, even if the other FPUs process their instructions ahead of the exception predicted FPU, they wait in their last stages for the exception predicted FPU to completely process its instruction.

Figure 7:
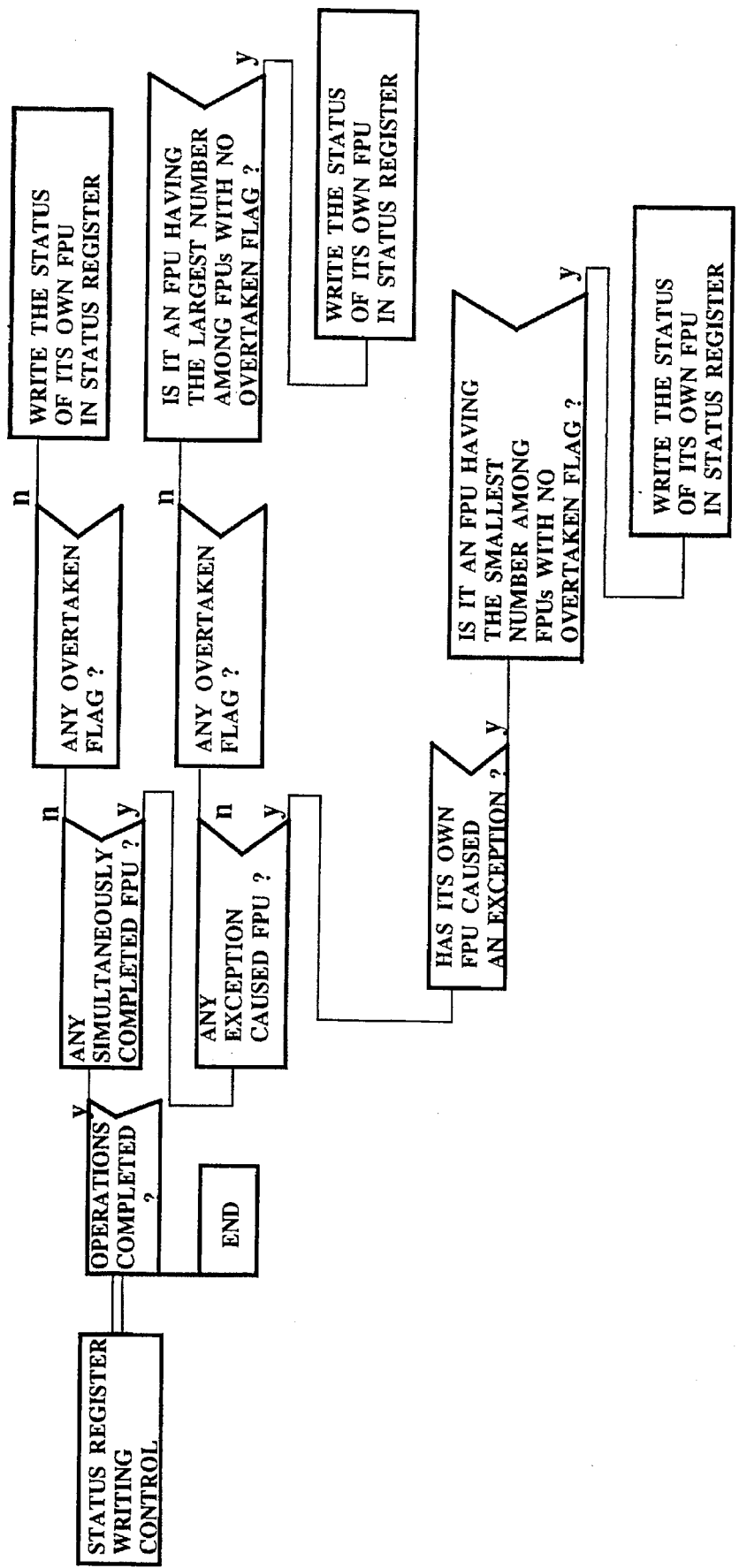
FIG. 7 is a PAD showing an algorithm of writing a status in a status register of FIG. 1.

FIG. 7 is a PAD showing an algorithm of writing data into the status register 33.

If an exception actually happens, instructions that are ahead of, in time series, the exception caused instruction are completely processed, and the exception caused instruction and instructions that are behind the exception caused instruction are aborted. Thereafter, the status of the exception caused operation is written in the status register 33.

When a plurality of FPUs are predicted to cause exceptions, instructions issued with the exception predicted instructions and fed to FPUs having smaller FPU numbers than the FPU having the smallest FPU number among the exception predicted FPUs are unconditionally completed. Instructions fed to the exception predicted FPUs having larger FPU numbers than the exception predicted FPU having the smallest FPU number are processed up to their third stages and then put in a wait state.

After it is determined whether or not the exception has actually occurred for each of the exception predicted instructions, the exception predicted FPUs having smaller FPU numbers than the FPU having the smallest FPU number among the exception caused FPUs completely execute instructions. Among the exception caused FPUs, an instruction in the FPU having the smallest FPU number, an instruction in the FPU having the smallest FPU number among the FPUs whose numbers are larger than that of the FPU mentioned above, and instructions of the FPUs having larger FPU numbers than that of the FPU mentioned above are aborted. The status of the instruction of the FPU having the smallest FPU number among the FPUs that have actually caused the exceptions is written in the status register 33.

Figure 8:
FIG. 8 is a view showing operation timing of the FPUs with exceptions being predicted to occur.

FIG. 8 is a timing chart with the FPUs 2 and 3 being predicted to cause exceptions. The FPU 1 receives a FALU instruction, the FPU 2 an FDIV instruction, the FPU 3 an FMPY instruction, and the FPU 4 a FALU instruction. The FDIV instruction to the FPU 2 and the FMPY instruction to the FPU 3 are predicted to cause exceptions. Among the exception predicted FPUs, the FPU 2 has the smallest FPU number, so that the FMPY instruction to the FPU 1 can be completely processed. The FDIV instruction in the FPU 2 takes time to process, so that the FMPY instruction in the FPU 3 and the FALU instruction in the FPU 4 both having larger FPU numbers than the FPU 2 are processed up to their third stages and then wait for the FDIV instruction in the FPU 2 to be completely processed.

If the FDIV instruction in the FPU 2 actually causes the exception, the processed results in the FPUs 2, 3, and 4 are abandoned irrespective of whether or not the FPU 3 causes the exception. Then, an exception flag of the FPU 2 having the smallest FPU number among the exception caused FPUs is written in the status register 33.

If the FPU 2 does not cause the exception and the FPU 3 causes the exception, a result of the FDIV instruction in the FPU 2 is written in the register file 31, and results of the FPUs 3 and 4 are abandoned. Then, an exception flag of the FPU 3 having the smallest FPU number among the exception caused FPUs is written in the status register 33.

If both the FPUs 2 and 3 do not cause the exceptions, results of the FPUs 2, 3, and 4 are all written in the register file 31, and an exception flag of the FPU 4 having the largest FPU number is written in the status register 33.

If an FMPY instruction is issued to the FPU 2 and an FDIV instruction to the FPU 3, and if both the instructions are predicted to cause an exception, the FMPY instruction to the FPU 2 is earlier checked to see whether or not it actually causes the exception than the FDIV instruction to the FPU 3. If the FMPY instruction to the FPU 2 actually causes the exception, the FDIV instruction to the FPU 3 is aborted, and an exception flag of the FPU 2 is written in the status register 33.

If the FMPY instruction to the FPU 2 does not cause the exception, the FMPY instruction is continuously processed in the FPU 2, and a result thereof is written in the register file 31. Among the FPUs which have completed their processes at the time the FMPY instruction is completed in the FPU 2, the FPU 2 has the largest FPU number, so that the exception flag of the FPU 2 is written in the status register 33.

Irrespective of the exception prediction and actual occurrence of the exception, instructions issued before the exception predicted instructions are continuously processed, and their results are written in the register file 31 irrespective of an occcurrence of an exception.

In this way, the parallel processing control apparatus according to the first embodiment of the invention has a simplified structure for controlling the parallel processing apparatus having a plurality of processing blocks of the same function. It is possible for the first embodiment, therefore, to omit decision value holding means of the second embodiment to be explained later.

In summary, the parallel processing control apparatus according to the first embodiment maintains a sequence of feeding instructions to a plurality of processing blocks having the same function, and simultaneously distributing instructions to the processing blocks according to the sequence. The first embodiment sets a flag indicating whether or not an instruction has been overtaken by another instruction, so that, even if the execution of an instruction is stopped due to an exception, the control can be sequentially done.

A parallel processing control apparatus according to the second embodiment of the invention will now be explained.

Figure 9:
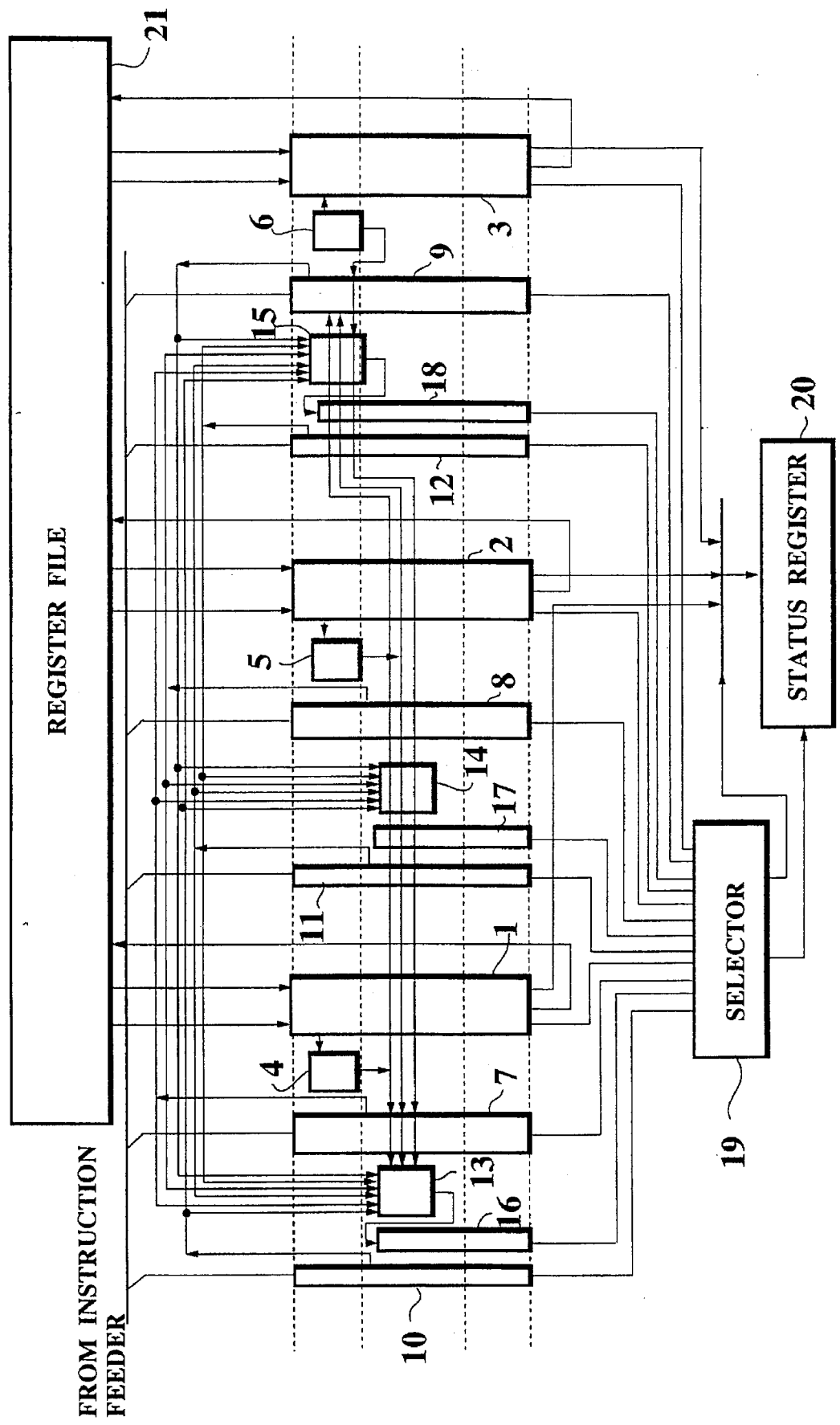
FIG. 9 is a view showing a floating-point processing portion with a parallel processing control apparatus according to a second embodiment of the invention.

FIG. 9 is a block diagram showing a floating-point processing portion employing the parallel processing control apparatus according to the second embodiment of the invention.

The floating-point processing portion of FIG. 9 comprises a 3-stage pipeline FALU (floating-point arithmetic and logic unit) 1, a 3-stage pipeline multiplier 2, and a 3-stage pipeline divider 3. The first pipeline stage of the divider 3 carries out a plurality of repetitive operations.

The FALU 1 involves an exception prediction circuit 4, a FALU controller 7, a pipeline register 10, a processor 13, and a pipeline register 16. The multiplier 2 involves an exception prediction circuit 5, a multiplier controller 8, and a pipeline register 17. The divider 3 involves an exception prediction circuit 6, a divider controller 9, a pipeline register 12, a processor 15, and a pipeline register 18.

The exception prediction circuit 4 determines whether or not any instruction being processed in the FALU 1 will cause an exception. Similarly, the exception prediction circuits 5 and 6 determine whether or not instructions being processed in the multiplier 2 and divider 3 may cause exceptions, respectively.

Each of the FALU controller 7, multiplier controller 8, and divider controller 9 determines whether or not a process must be moved forward to the next stage.

The pipeline register 10 holds an instruction number allocated for an instruction issued to the FALU 1 among simultaneously issued instructions. The pipeline register 11 holds an instruction number allocated for an instruction issued to the multiplier 2 among the simultaneously issued instructions. The pipeline register 12 holds an instruction number allocated for an instruction issued to the divider 3 among the simultaneously issued instructions.

The processor 13 determines whether or not an instruction being processed in the FALU 1 has been overtaken by another instruction that is behind, on a sequential model, the instruction in the FALU 1 and being processed in the multiplier 2 or the divider 3. Similarly, the processor 14 determines whether or not an instruction being processed in the multiplier 2 has been overtaken by another instruction that is behind, on a sequential model, the instruction in the multiplier 2 and being processed in the FALU 1 or the divider 3. The processor 15 determines whether or not an instruction being processed in the divider 3 has been overtaken by another instruction that is behind, on a sequential model, the instruction in the divider 3 and being processed in the FALU 1 or the multiplier 2.

The pipeline register 16 holds a flag indicating that the overtaking has occurred, if the processor 13 determines so. The pipeline register 17 holds a flag indicating that the overtaking has occurred, if the processor 14 determines so. The pipeline register 18 holds a flag indicating that the overtaking has occurred, if the processor 15 determines so.

A selector 19 selects the statuses of the operation units according to the values or flags stored in the pipeline registers 10, 11, 12, 16, 17, and 18, and operation results of the FALU 1, multiplier 2, and divider 3.

A status register 20 holds the status of an operation unit selected by the selector 19. A register file 21 holds data to be processed by the operation units and results of operations of the operation units.

An instruction distributer (not shown) provides instructions to the floating-point processing portion.

Each of the operation units (FALU 1, multiplier 2, and divider 3) has a 3-stage pipeline configuration. In the pipeline configuration, the first, second, and third stages are referred to as E1, E2, and E3, respectively. In the divider 3, the E1 stage involves 10 repetitions.

A processor employing the floating-point processing portion of FIG. 9 is also provided with an integer operation portion. The processor operates through an F stage (an instruction fetching stage), a D stage (an instruction decoding stage), an E stage (the three stages carried out in each operation unit), and a W stage (an operation result writing stage). The integer operation portion is completed in one stage, while the floating-point processing portion is completed in three stages.

Figure 10:
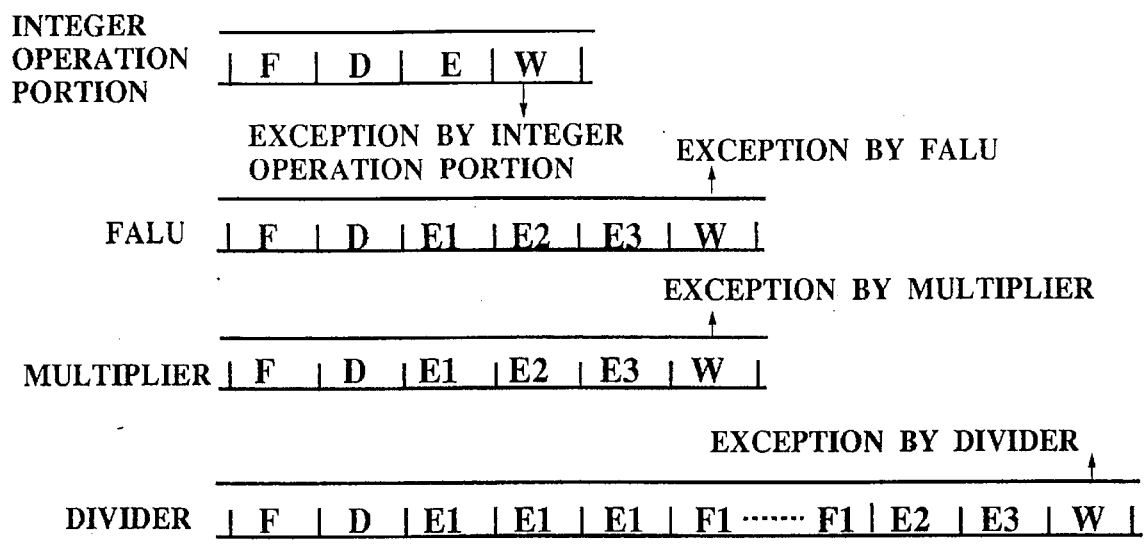
FIG. 10 is a view showing timing of instruction processing and exception occurrence in operation units with no exception prediction being carried out.

FIG. 10 is a timing chart showing the integer operation portion and the floating-point processing portion with no exception being predicted.

Whether or not an exception actually occurs is determined only after operations are completed. Accordingly, an exception that will happen in the integer operation portion can be reflected to the floating-point processing portion. An exception that will happen in the floating-point processing portion, however, will be determined only in the E3 stage.

If no exception prediction is carried out and if an exception actually occurs in the floating-point processing portion, an instruction issued to the integer operation portion will have been completely executed at the time of occurrence of the exception. This causes a contradiction on a sequential model of instructions. A similar contradiction will happen in the floating-point processing portion because the execution time of a division is longer than other operations. Namely, an overtaking will occur when executing an exception process.

To deal with this, the FALU 1, multiplier 2, and divider 3 are provided with the exception prediction circuits 4, 5, and 6 (disclosed in Japanese Patent Application No 2-181590), respectively. The exception prediction circuits 4, 5, and 6 check to see whether or not the corresponding operation units will cause an exception during the processing of instructions. If the exception prediction circuits 4, 5, and 6 set no flag, it is ensured that exceptions will never happen as a result of execution of instructions.

The exception prediction circuits 4, 5, and 6 can finish the exception prediction within one stage. Namely, the prediction is completed in the E1 stage of the FALU 1 and multiplier 2 and in the first clock period of the E1 stage of the divider 3.

If any one of the exception prediction circuits 4, 5, and 6 predicts an exception in the E1 stage (in the divider 3, the first clock period of the E1 stage), a stall request signal is provided in the E2 stage (in the divider 3, the second clock period of the E1 stage). The E2 stage (in the divider 3, the second clock period of the E1 stage) corresponds to the W stage of the integer operation portion. When the integer operation portion causes an exception, a TRAP signal (an exception occurred signal) is provided in this W stage.

There are several methods of dealing with an exception in the superscalar system. For example, one method completely processes instructions that are ahead of, on a sequential model, an exception caused instruction among instructions simultaneously issued with the exception caused instruction and then enters into an exception process. Another method aborts all instructions simultaneously issued with the exception caused instruction and then executes the aborted instructions in an exception process.

The embodiment of the invention aborts all instructions simultaneously issued with an exception caused instruction, and processes the aborted instructions in an exception process.

When the integer operation portion provides a TRAP signal, instructions being processed in the E1 stages (in the divider 3, the first clock period of the E1 stage) and instructions being processed in the E2 stages (in the divider 3, the second clock period of the E1 stage) of the floating-point processing portion are all aborted, and instructions that are ahead of, on a sequential model, the aborted instructions are continuously processed and completed. Namely, instructions being processed in the E3 stages (in the divider 3, the third clock period of the E1 stage and onward) are continuously processed and completed.

Figure 11:
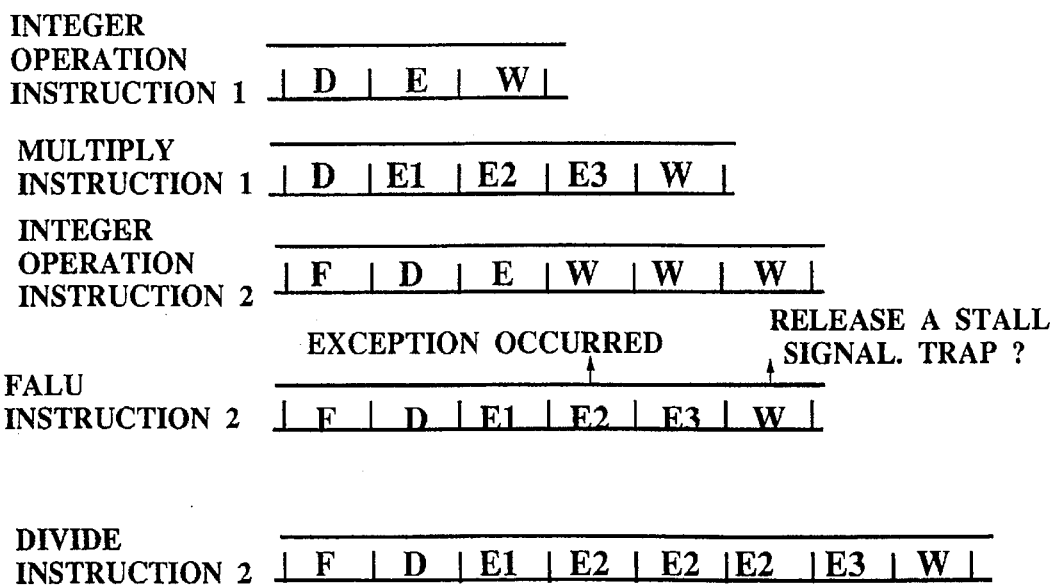
FIG. 11 is a view showing timing of instruction processing with the parallel processing control apparatus according to the second embodiment freezing instructions.

FIG. 11 is a timing chart showing operations with the exception prediction.

In the figure, an integer operation instruction 1 and a multiply instruction 1 are simultaneously issued. An integer operation instruction 2, a FALU instruction 2, and a multiply instruction 2 are simultaneously issued in the next clock period. An exception is predicted in the FALU instruction 2.

When the exception is predicted in the exception prediction circuit 4, a stall request signal is provided. The feeding of instructions to the operation units is stopped, and the E and W stages of the integer operation portion are frozen until the stall request signal is released. In the floating-point processing portion, the instructions being processed in the E1 stages (in the divider 3, the first clock period of the E1 stage) are frozen.

If any instruction is predicted its exception in the E2 stage (in the divider 3, the second clock period of the E1 stage) by the exception prediction circuit 5 or 6, the instruction is continuously processed, and if not predicted its exception, the instruction is freezed. Instructions being processed in the E3 stages (in the divider 3, the third clock of the E1 stage) onward are continuously processed.

FIG. 12 is a timing chart showing the operation units with an exception actually occurring.

The FALU 1 provides a stall request signal in the E2 stage (in the divider 3, the second clock period of the E1 stage), and continues to provide the stall request signal in the next and following stages while continuously processing the instruction up to the W stage, where the FALU 1 stops the stall request signal. If there is a stall request signal provided by another operation unit, the FALU 1 freezes its operation in the W stage.

For example, if the FALU 1 and divider 3 simultaneously predict exceptions, the FALU 1 provides a stall request signal, proceeds to the W stage in two clock periods, stops providing the stall request signal, and waits for the divider 3 to proceed to its own W stage. The divider 3 provides a stall request signal, advances to the W stage in 11 clock periods, and stops providing the stall request signal. When all stall request signals are stopped and if no exception actually happens on the exception predicted instructions, all stages are resumed. If the exception actually happens, the instructions frozen in the F, D, E1, and E2 stages and the exception predicted instructions are aborted.

Once a stall request signal is provided, instructions being processed in the E2 stages (in the divider 3, the second clock period of the E1 stage) and predicted no exception are tested by the processors 13, 14, and 15 whether or not the instructions have been overtaken by other instructions according to numbers stored in the pipeline registers 10, 11, and 12, and prediction results of the exception prediction circuits 4, 5, and 6.

For example, if the exception prediction circuit 4 of the FALU 1 predicts an exception, instructions being processed in the FALU 1 will be continuously processed, and therefore, no flag is set for these instructions.

If the exception prediction circuit 4 does not predict an exception and if the exception prediction circuit 5 predicts an exception, an instruction number corresponding to the E2 stage held in the pipeline register 10 is compared with an instruction number corresponding to the E2 stage held in the pipeline register 11.

If the value stored in the pipeline register 10 is smaller than that held in the pipeline register 11, i.e., if an instruction being processed in the E2 stage of the FALU 1 is ahead of, in a sequential model, an instruction being processed in the E2 stage of the multiplier 2, it is determined that the instruction in the E2 stage of the FALU 1 has been overtaken by the instruction in the E2 stage of the multiplier 2, and a flag is set in the pipeline register 16.

When the exception prediction circuit 6 of the divider 3 predicts an exception to occur, the processor 13 of the FALU 1 compares, similar to the case of the multiplier 2, an instruction being processed in the second clock period of the E1 stage of the divider 3 with an instruction being processed in the E2 stage of the FALU 1, and sets a flag in the pipeline register 16 if the overtaking is detected.

For the instruction being processed in the E2 stage of the multiplier 2, if the exception prediction circuit 5 does not predict an exception and if the exception prediction circuit 4 or 6 predicts an exception, the processor 14 operates similar to the processor 13. If the instruction in the E2 stage of the multiplier 2 is overtaken by another instruction, a flag is set in the pipeline register 17.

For the instruction being executed in the second clock period of the E1 stage of the divider 3, if the exception prediction circuit 6 does not predict an exception and if the exception prediction circuit 4 or 5 predicts an exception, the processor 15 operates similar to the processor 13 or 14. If the instruction in the second clock period of the E1 stage of the divider 3 is overtaken by another instruction, a flag is set in the pipeline register 18.

In the divider 3, if there is a division instruction anywhere from the third clock period of the E1 stage to the E2 stage and if there if an instruction in the E2 stage of the FALU 1 or the E2 stage of the multiplier 2, it is determined that the division instruction has been overtaken by the other instruction, and the processor 15 sets a flag in the pipeline register 18.

Figure 13:
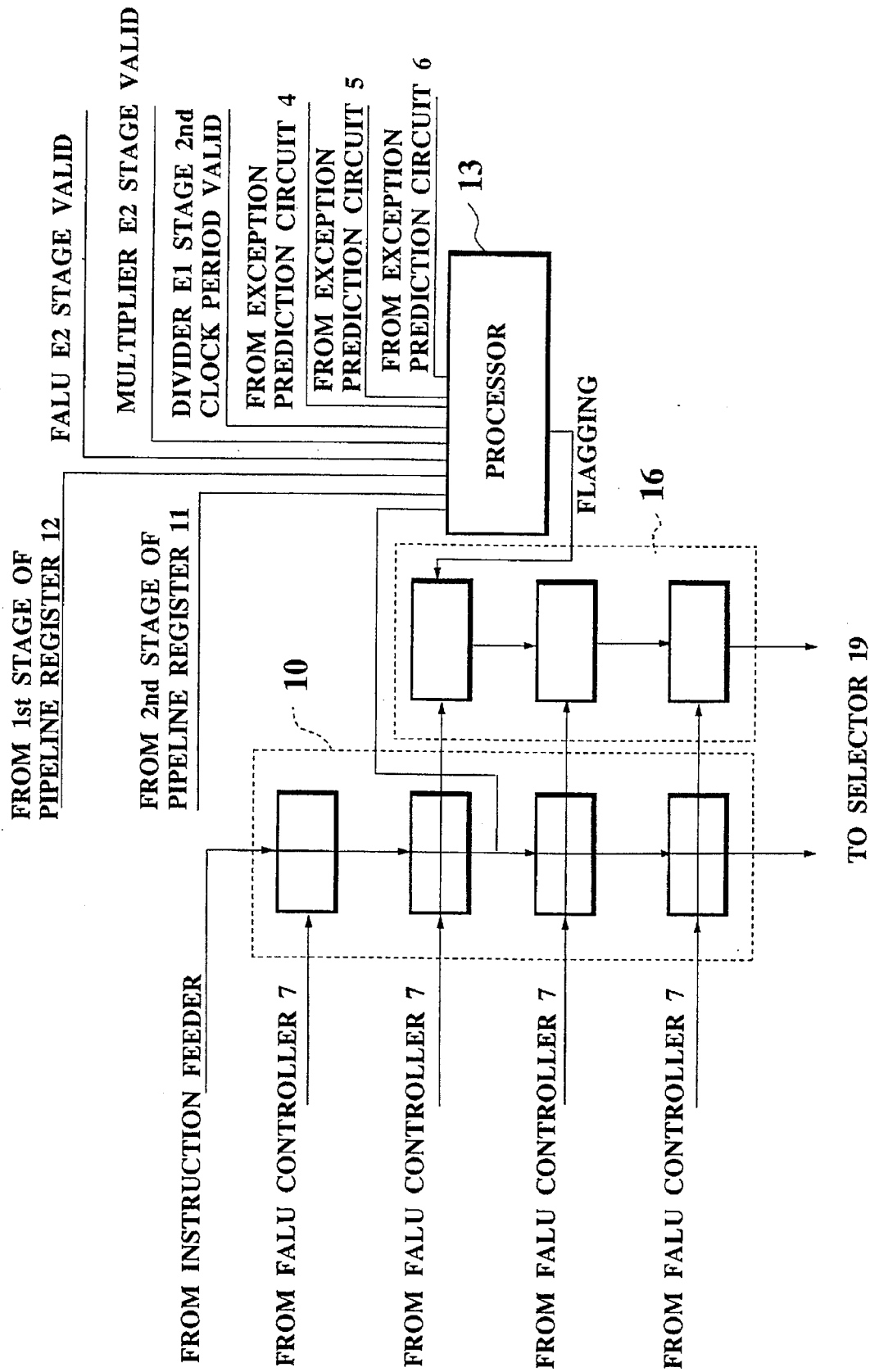
FIG. 13 is a view showing connection between pipeline registers 10 and 16 and a processing circuit 13 of FIG. 9.

FIG. 13 shows the details of the pipeline register 10, processor 13, and pipeline register 16 of the FALU 1.

In FIG. 13, the pipeline register 10 is a 4-stage pipeline register for storing an instruction number on a sequential model of an instruction issued to the FALU 1 among simultaneously issued instructions. Whenever an instruction is issued to the FALU 1, the instruction number thereof is held in the first stage of the pipeline register 10. Each instruction number stored in the pipeline register 10 is moved forward through the pipeline stages according to the movement of a corresponding instruction in the FALU 1. The FALU controller 7 moves the instruction numbers forward through the stages. The processor of this embodiment can simultaneously issue four instructions at the maximum, so that the bit width of one stage of the pipeline register 10 is two bits at the minimum.

Figure 14:
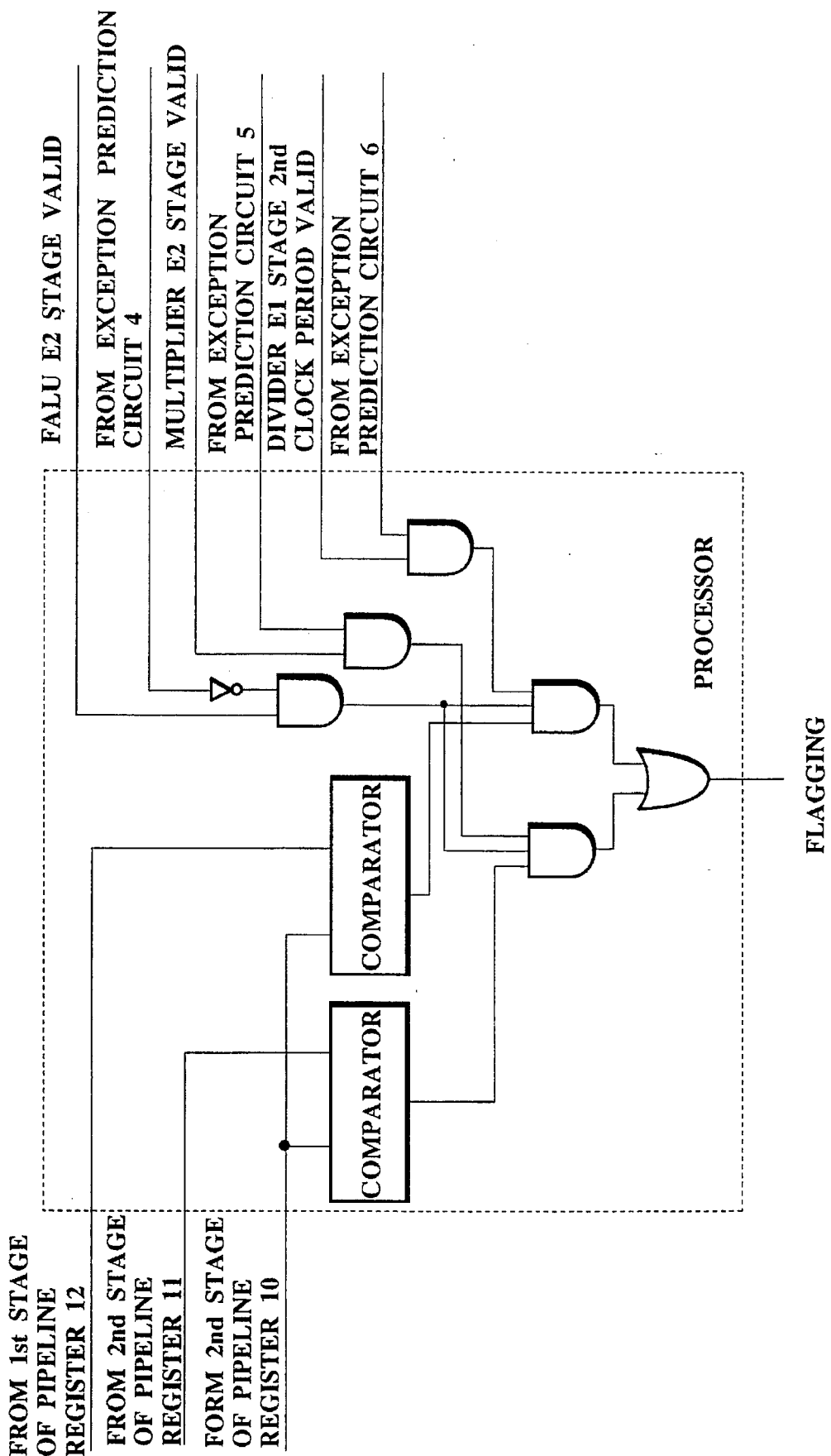
FIG. 14 is a view showing the details of the processing circuit 13 of FIG. 13.

FIG. 14 shows the details of the processor 13.

The processor 13 receives signals from the exception prediction circuits 4, 5, and 6, a value stored in the second stage of the pipeline register 10 (corresponding to an instruction being processed in the E2 stage of the FALU 1), a value stored in the second stage of the pipeline register 11 (corresponding to an instruction being processed in the E2 stage of the multiplier 2), a value held in the first stage of the pipeline register 12 (corresponding to an instruction being processed in the E3 stage of the divider 3), a signal from the FALU controller 7 for indicating whether or not an operation being processed in the E2 stage of the FALU 1 is valid (hereinafter referred to as the FALU-E2 validity signal), a signal from the multiplier controller 8 for indicating whether or not an operation being processed in the E2 stage of the multiplier 2 is valid (hereinafter referred to as the multiplier-E2 validity signal), and a signal from the divider controller 9 for indicating that an operation being processed in the E1 stage of the divider 3 is valid and that the operation is carried out in the second clock period of the E1 stage (hereinafter referred to as the divider-E1-2 validity signal).

When the FALU-E2 validity signal is valid and when the exception prediction circuit 4 does not predict an exception, the multiplier-E2 validity signal and a result of prediction from the exception prediction circuit 5 are checked.

If the multiplier-E2 validity signal is valid with an exception being predicted in the multiplier 2 and if the exception does not actually occur, the instruction being processed in the E2 stage of the multiplier 2 will be completed before the instruction now being processed in the E2 stage of the FALU 1.

At this time, a value stored in the second stage of the pipeline register 10 is compared with a value stored in the second stage of the pipeline register 11. If the value stored in the second stage of the pipeline register 10 is smaller than the other, it is determined that the instruction in the FALU 1 is ahead of, on a sequential model, the instruction in the multiplier 2. This means that the multiply instruction may overtake the instruction in the FALU 1. The instruction being processed in the E2 stage of the FALU 1, therefore, is determined to be overtaken by the multiply instruction, and a flag indicating this overtaking is set in the pipeline register 16.

The processor 13 carries out the same process for the instruction being processed in the E2 stage of the FALU 1 and an instruction being processed in the second clock period of the E1 stage of the divider 3. If the instruction in the E2 stage of the FALU 1 is overtaken by the instruction in the E2 stage of the multiplier 2 or the instruction in the second clock period of the E1 stage of the divider 3, a flag is set in the pipeline register 16.

The pipeline register 16 is a 3-stage pipeline register each having one bit width. A flag set in the first stage of the pipeline register 16 advances through the stages similar to the instruction being processed in the E2 stage of the FALU 1.

For the multiplier 2, the pipeline register 11, processor 14, and pipeline register 17 set a flag in the pipeline register 17 in a similar manner. The processor 14 has the same arrangement as the processor 13.

Figure 15:
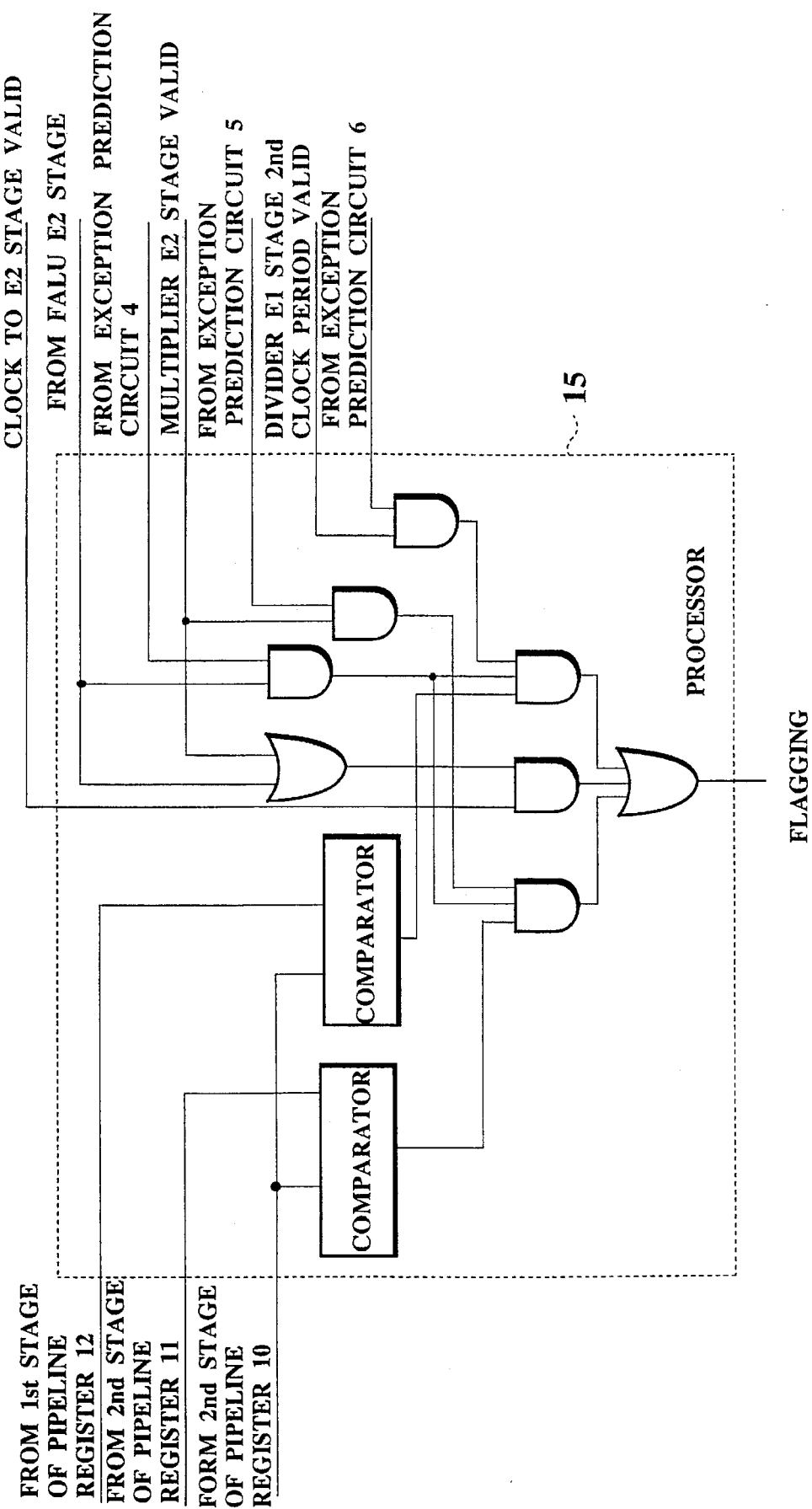
FIG. 15 is a view showing the details of a processing circuit 15 of FIG. 9.

FIG. 15 shows the details of the processor 15 of the divider 3.

Since the E1 stage of the divider 3 comprises a plurality of clock periods, a condition of setting a flag indicating an overtaking in the pipeline register 18 differs from those of the FALU 1 and multiplier 2.

Unlike the pipeline registers 16 and 17, the pipeline register 18 sets a flag indicating an overtaking in the first stage thereof according to the same conditions as for the FALU 1 and multiplier 2, provided that there is a division instruction in the second clock period of the E1 stage, there is no exception prediction for the same instruction, and there is an exception prediction in the FALU 1 or the multiplier 2.

If there is a division instruction somewhere from the third clock period of the E1 stage to the E2 stage of the divider 3 and if there is an instruction being processed in the E2 stage of the FALU 1 or the multiplier 2, the processor 15 sets an overtaking flag in the pipeline register 18 because the division instruction is apparently overtaken by any one of those instructions.

When it comes to the W stage in each of the operation units, the selector 19 determines whether or not data is written in the status register 20, and selects an operation unit whose data is to be written in the status register 20.

The selector 19 receives signals indicating whether or not the W stages of the operation units are valid from the FALU controller 7, multiplier controller 8, and divider controller 9, values corresponding to the W stages of the operation units from the pipeline registers 10, 11, and 12, flags indicating whether or not the instructions in the W stages of the operation units have been overtaken by other instructions from the pipeline registers 16, 17, and 18, and signals indicating whether or not the instructions in the W stages of the operation units have caused exceptions from the FALU 1, multiplier 2, and divider 3.

The selector 19 checks the signals indicating whether or not the W stages of the operation units are valid from the FALU controller 7, multiplier controller 8, and divider controller 9, and selects the statuses of the operation units having valid signals. Thereafter, the selector 19 checks the flags from the pipeline registers 16, 17, and 18, and excludes from the selected statuses those of the instructions having a flag indicating that the instruction has been overtaken by another instruction and that the status of an instruction that is behind, on a sequential model, the instruction in question seems to have been already written in the status register 20.

If no operation unit has actually caused an exception, the selector 19 compares the instruction numbers of the remaining statuses with use of the pipeline registers 10, 11, and 12, and selects the status of an instruction having a largest instruction number, i.e., the instruction that is hindmost on the sequential model.

If any operation unit has caused an exception, the selector 19 selects the exception caused instructions, compares the instruction numbers of the selected instructions with use of the pipeline registers 10, 11, and 12, and selects the status of an instruction having a smallest instruction number, i.e., a foremost instruction on the sequential model. The status thus selected by the selector 19 is written in the status register 20.

As mentioned above, the embodiment aborts all instructions issued simultaneously with an exception caused instruction, and processes the aborted instructions in an exception process. The invention is not limited by this method but achievable with other methods.

For example, instructions that have been simultaneously issued with an exception caused instruction and ahead of, on a sequential model, the exception caused instruction may be completely processed, and then an exception process is carried out. In this case, values stored in the pipeline registers 10, 11, and 12 of instructions for which exceptions have been predicted or not predicted in the E2 stage are compared with one another. As a result of the comparison, exception-not-predicted instructions that are ahead of, on a sequential model, exception-predicted instructions are continuously processed, and exception-not-predicted instructions behind the exception-predicted instructions are frozen.

In this way, the second embodiment arranges a plurality of operation units having different functions, and employs means for recognizing the order of a given instruction among instructions simultaneously issued with the given instruction, or recognizing an operation unit that is processing an instruction that is just ahead of the given instruction, and means for determining whether or not an instruction being processed has been overtaken by an instruction being processed in another operation unit and storing a result of the determination. With this arrangement, the second embodiment controls and maintains a correct sequence of operation.

Various modifications will become possible for those skilled in the art after receiving the teachings of the present disclosure without departing from the scope thereof.

What if claimed is:

1. A parallel processing control apparatus comprising:

a plurality of processing blocks each providing an equal function and incorporating pipeline operation units;

a status register for storing processing status of each of said processing blocks;

instruction feeding means for simultaneously allocating one instruction from a set of instructions with a predetermined order of execution to each of said processing blocks, respectively, according to a predetermined sequence of said processing blocks;

exception prediction means for checking, in a first pipeline stage of an instruction, if said instruction may possibly cause an exception that at least one instruction overtakes an instruction which is ahead of said at least one instruction according to said predetermined order of execution;

flagging means for setting a flag for a corresponding one of said processing blocks to indicate a possibility of said exception;

flag holding means for holding the flag; and write decision means for writing the status of processing block when the processing block completes an instruction;

wherein said write decision means continuously processes, if an instruction causes an exception, instructions that have been simultaneously allocated by said instruction feeding means with the instruction that caused the exception and are, according to said predetermined order of execution, positioned ahead of said instruction that caused the exception, aborts those instructions which are, according to said predetermined order of execution behind said instruction that caused the exception, and writes the status of the instruction that caused the exception in said status register, and wherein execution of all instructions which are, according to said predetermined order of execution of the instructions, positioned behind an instruction which is predicted to possibly cause an exception is prevented from being completed until execution of said instruction which is predicted to possibly cause an exception is completed.

2. The parallel processing control apparatus according to claim 1, wherein said write decision means selects, if plurality of said processing blocks simultaneously completed processing an instruction without causing an exception, a processing block without a flag which is positioned hindmost in said predetermined sequence among said plurality of processing blocks which have simultaneously completed processing of an instruction, and writes a result of execution of the instruction of the selected processing block into said status register.

3. The parallel processing control apparatus according to claim 1, wherein said write decision means continuously processes, if a plurality of instructions simultaneously cause exceptions, instructions that are positioned ahead of an foremost exception causing instruction which had been executed in a processing block that is positioned foremost in said predetermined sequence of processing blocks among the processing blocks in which exceptions have occurred, aborts those instructions which are positioned behind said foremost exception causing instruction including those instructions causing the exceptions, and writes the status of the processing block of the foremost exception causing instruction in said status register.

4. A parallel processing control apparatus comprising:

a plurality of processing blocks each providing an equal function and incorporating pipeline operation units;

a status register for storing processing status of each of said processing blocks;

instruction feeding means for simultaneously allocating one instruction from a set of instructions with a predetermined order of execution to each of said processing blocks, respectively, according to a predetermined sequence of said processing blocks;

exception prediction means for checking, in a first pipeline stage of an instruction, if said instruction may possibly cause an exception that at least one instruction overtakes an instruction which is ahead of said at least one instruction according to said predetermined order of execution;

flagging means for setting a flag for a corresponding one of said processing blocks to indicate a possibility of said exception;

flag holding means for holding the flag; and write decision means, wherein said write decision means selects, if plurality of said processing blocks simultaneously completed processing an instruction without causing an exception, a processing block without a flag which is positioned hindmost in said predetermined sequence among said plurality of processing blocks which have simultaneously completed processing of an instruction, and writes a result of execution of the instruction of the selected processing block into said status register, wherein said write decision means continuously processes, if an instruction causes an exception, instructions that have been simultaneously allocated by said instruction feeding means with the instruction that caused the exception and are, according to said predetermined order of execution, positioned ahead of said instruction that caused the exception, aborts those instructions which are, according to said predetermined order of execution behind said instruction that caused the exception, and writes the status of the instruction that caused the exception in said status register, and wherein said write decision means continuously processes, if a plurality of instructions simultaneously cause exceptions, instructions that are positioned ahead of an foremost exception causing instruction which had been executed in a processing block that is positioned foremost in said predetermined sequence among the processing blocks in which exceptions have occurred, aborts those instructions which are positioned behind said foremost exception causing instruction including those instructions causing the exceptions, and writes the status of the processing block of the foremost exception causing instruction in said status register, wherein execution of all instructions which are, according to said predetermined order of execution of the instructions, positioned behind an instruction which is predicted to possibly cause an exception is prevented from being completed until execution of said instruction which is predicted to possibly cause an exception is completed.

5. A parallel processing control apparatus for a processing system having a plurality of pipelined operating units having pipeline stages of a fetch stage, a decode stage, a plurality of execution stage and a write stage, said system successively issuing a plurality of instructions to said operating units in each clock period, said control apparatus comprising:

a plurality of decision value holding means, each associated with different ones of said operating units for holding a plurality of position values, from a predetermined order of execution of instructions, of associated instructions issued to said associated operation unit among instructions that have been simultaneously issued to said plurality of operation units;

a plurality of exception prediction means, each associated with different ones of said operating units for checking, in a third pipeline stage of processing said instruction, the possibility of causing an exception, wherein, upon detecting of the possibility of causing an exception by one of said exception prediction means, all said instructions issued after said instruction may caused exception are prevented from being completed until the completion of said instruction while any instruction issued prior to and simultaneously said instruction continuous to be executed;

a plurality of flagging means, each associated with different ones of said of operation units and responsive to said plurality of exception prediction means, for setting a flag to indicate that prediction means of an associated operation unit does not predict an exception, that prediction means of at least one of the other operation predict an exception and that the position value of said at least one operating unit is larger than the position value of said associated operating unit, whereby the setting of said flag indicating the instruction executed by said associated operating unit has been overtaken;

a plurality of flag holding means, each associated with different ones of said plurality of operating units, coupled to said associated flagging means, for holding the flag; and selection control means, responsive to said plurality of flag holding means, for selecting one of said operation units whose status is to be written in a status register when execution of an instruction is completed or when an exception actually occurs, wherein said selection control means writes the status of an operating unit into said status register if said operating unit completes an execution of an instruction without occurrence of an actual exception, and does not write the status of operating unit into said status register if a flag for the instruction is set to indicate that a status of another instruction that is behind the instruction is already written in the status register.

6. The parallel operation control apparatus according to claim 5, wherein, if a plurality of instructions are simultaneously completed without an occurrence of an exception, said selection control means selects an instruction which is, according to said predetermined order of execution of the instructions, positioned hindmost among the simultaneously completed instructions according to values stored in said decision value holding means, and writes the status of the selected instruction into the status register, thereby excluding status of flagged instructions from being written into the status register.

7. The parallel processing control apparatus according to claim 5, wherein, if any instruction actually caused an exception, said selection control means continuously processes instructions that have been simultaneously issued with the instruction causing the exception and are determined to be, according to said predetermined order of execution, ahead of the instruction causing the exception according to values held in said decision value holding means, aborts those instructions that are behind the instruction causing the exception, writes the status of the instruction causing the exception into the status register, while if a plurality of instructions caused exceptions, said selection control means writes, into the status register, the status of one of the instructions causing the exceptions that is determined to be, according to said predetermined order of execution, foremost according to values stored in said decision value holding means, continuously processes instructions that are ahead of the foremost instruction causing the exception, and aborts all instructions that are behind the foremost instruction causing the exception.

8. A parallel processing control apparatus for a processing system having a plurality of pipelined operating units having pipeline stages of a fetch stage, a decode stage, a plurality of execution stage and a write stage, said system successively issuing a plurality of instructions to said operating units in each clock period, said control apparatus comprising:

a plurality of decision value holding means, each associated with different ones of said operating units for holding a plurality of position values, from a predetermined order of execution of instructions, of associated instructions issued to said associated operation unit among instructions that have been simultaneously issued to said plurality of operation units;

a plurality of exception prediction means, each associated with different ones of said operating units for checking, in a third pipeline stage of processing said instruction, the possibility of causing an exception, wherein, upon detecting of the possibility of causing an exception by one of said exception prediction means, all said instructions issued after said instruction may caused exception are prevented from being completed until the completion of said instruction while any instruction issued prior to and simultaneously said instruction continuous to be executed;

a plurality of flagging means, each associated with different ones of said of operation units and responsive to said plurality of exception prediction means, for setting a flag to indicate that prediction means of an associated operation unit does not predict an exception, that prediction means of at least one of the other operation predict an exception and that the position value of said at least one operating unit is larger than the position value of said associated operating unit, whereby the setting of said flag indicating the instruction executed by said associated operating unit has been overtaken;

a plurality of flag holding means, each associated with different ones of said plurality of operating units, coupled to said associated flagging means, for holding the flag; and selection control means, responsive to said plurality of flag holding means, for selecting one of said operation units whose status is to be written in a status register when execution of an instruction is completed or when an exception actually occurs, wherein said selection control means selects, if a plurality of instructions are simultaneously completed without an occurrence of an exception, an instruction which is, according to said predetermined order of execution of the instructions, positioned hindmost among the simultaneously completed instructions according to values stored in said decision value holding means, writes the status of the selected instruction into the status register, thereby excluding status of flagged instructions from being written into the status register, wherein said selection control means continuously processes, if any instruction actually caused an exception, instructions that have been simultaneously issued with the instruction causing the exception and are determined to be, according to said predetermined order of execution, ahead of the instruction causing the exception according to values held in said decision value holding means, aborts those instructions that are behind the instruction causing the exception, and writes the status of the instruction causing the exception into the status register, wherein said selection control means writes into the status register, if a plurality of instructions caused exceptions, the status of one of the instructions causing the exceptions that is determined to be, according to said predetermined order of execution, foremost according to values stored in said decision value holding means, continuously processes instructions that are ahead of the foremost instruction causing the exception, and aborts all instructions that are behind the foremost instruction causing the exception.

* * * * *